United States Patent
Gaviani et al.

(10) Patent No.: US 10,988,134 B2
(45) Date of Patent: Apr. 27, 2021

(54) METHOD TO CONTROL A HYBRID DRIVE SYSTEM FOR A ROAD VEHICLE

(71) Applicant: MARELLI EUROPE S.p.A., Corbetta (IT)

(72) Inventors: Giovanni Gaviani, Rimini (IT); Ignazio Dentici, Bologna (IT); Marco Panciroli, Bologna (IT)

(73) Assignee: MARELLI EUROPE S.p.A, Corbetta (IT)

( * ) Notice: Subject to any disclaimer, the term of this patent is extended or adjusted under 35 U.S.C. 154(b) by 444 days.

(21) Appl. No.: 15/969,324

(22) Filed: May 2, 2018

(65) Prior Publication Data
US 2018/0319390 A1    Nov. 8, 2018

(30) Foreign Application Priority Data

May 4, 2017    (IT) .......................... 102017000047852

(51) Int. Cl.
*B60W 10/06*    (2006.01)
*B60W 10/08*    (2006.01)
(Continued)

(52) U.S. Cl.
CPC ............ *B60W 20/20* (2013.01); *B60W 10/06* (2013.01); *B60W 10/08* (2013.01); *F02B 39/10* (2013.01);
(Continued)

(58) Field of Classification Search
CPC ... B60W 2710/086; B60W 2710/0605; B60W 2710/0622; B60W 2710/0644;
(Continued)

(56) References Cited

U.S. PATENT DOCUMENTS

| | | | |
|---|---|---|---|
| 10,174,653 B2 * | 1/2019 | Petley | G10K 11/17873 |
| 10,625,621 B2 * | 4/2020 | Scolari | H02J 7/1423 |

(Continued)

FOREIGN PATENT DOCUMENTS

| | | |
|---|---|---|
| CN | 101734138 A | 6/2010 |
| CN | 103847492 A | 6/2014 |

(Continued)

OTHER PUBLICATIONS

First Office Action for Chinese Patent Application No. 201810422161.8 dated Jul. 3, 2020.

(Continued)

*Primary Examiner* — Phutthiwat Wongwian
*Assistant Examiner* — Arnold Castro
(74) *Attorney, Agent, or Firm* — Howard & Howard Attorneys PLLC (57) ABSTRACT

A method for controlling a hybrid drive system for a road vehicle provided with at least a pair of drive wheels; the hybrid drive system comprises: an internal combustion heat engine, which is designed to transmit the motion to the drive wheels and is provided with a turbocharger equipped with a turbine; a first electric machine, which is able to transmit the motion to the drive wheels; and a second electric machine, which is mechanically connected to the turbine of the turbocharger. In a possible operating mode, the internal combustion heat engine is controlled to pursue a target torque by completely opening a throttle valve, operating the second electric machine as an electric generator and the first electric machine as a motor, and varying the electric power generated by the second electric machine so as to adjust the flow rate of fresh air fed to the cylinder of the internal combustion heat engine.

21 Claims, 4 Drawing Sheets

(51) Int. Cl.
*B60W 20/20* (2016.01)
*F02D 41/00* (2006.01)
*F02B 39/10* (2006.01)
*F02B 41/10* (2006.01)

(52) U.S. Cl.
CPC .......... *F02B 41/10* (2013.01); *F02D 41/0007* (2013.01); *B60W 2540/10* (2013.01); *B60W 2710/0605* (2013.01); *B60W 2710/0622* (2013.01); *B60W 2710/0644* (2013.01); *B60W 2710/0666* (2013.01); *B60W 2710/086* (2013.01); *Y10S 903/906* (2013.01); *Y10S 903/93* (2013.01)

(58) Field of Classification Search
CPC ......... B60W 2710/0666; B60W 20/20; B60W 10/06; B60W 10/08; B60W 2540/10; F02D 41/0007; F02B 39/10; F02B 41/10; Y10S 903/93; Y10S 903/906; B61C 7/00
See application file for complete search history.

(56) References Cited

U.S. PATENT DOCUMENTS

| | | | | |
|---|---|---|---|---|
| 2004/0260448 | A1* | 12/2004 | Gaviani | G05B 19/0421 |
| | | | | 701/101 |
| 2006/0218923 | A1* | 10/2006 | Sopko, Jr. | B60K 6/46 |
| | | | | 60/607 |
| 2009/0057042 | A1* | 3/2009 | Puccetti | B60W 10/08 |
| | | | | 180/65.265 |
| 2009/0143961 | A1* | 6/2009 | Gaviani | B60W 40/09 |
| | | | | 701/110 |
| 2010/0050987 | A1* | 3/2010 | Sato | F02D 11/105 |
| | | | | 123/406.25 |
| 2010/0107632 | A1* | 5/2010 | Wu | B60W 20/00 |
| | | | | 60/608 |
| 2013/0144508 | A1* | 6/2013 | Dentici | F02D 41/0097 |
| | | | | 701/103 |
| 2014/0230436 | A1* | 8/2014 | Wong | B60K 6/26 |
| | | | | 60/615 |
| 2016/0016577 | A1 | 1/2016 | Holmes | |
| 2016/0108799 | A1* | 4/2016 | Stoffels | F02B 37/004 |
| | | | | 60/607 |
| 2016/0138508 | A1* | 5/2016 | Sczomak | F02D 41/28 |
| | | | | 701/2 |
| 2016/0356210 | A1* | 12/2016 | Yamashita | F02B 39/10 |
| 2018/0073455 | A1* | 3/2018 | Barra | F02D 37/02 |

FOREIGN PATENT DOCUMENTS

| | | |
|---|---|---|
| CN | 105313671 A | 2/2016 |
| DE | 102012105069 A1 | 1/2013 |
| DE | 202014105279 U1 | 11/2014 |
| DE | 102014221333 A1 | 4/2016 |
| EP | 2971640 A1 | 1/2016 |
| EP | 3088124 a1 | 11/2016 |
| WO | 2014165233 a1 | 10/2014 |

OTHER PUBLICATIONS

Search Report for Italian Application No. 201700047852 dated Mar. 6, 2018.

* cited by examiner

METHOD TO CONTROL A HYBRID DRIVE SYSTEM FOR A ROAD VEHICLE

PRIORITY CLAIM

This application claims priority from Italian Patent Application No. 102017000047852 filed on May 4, 2017, the disclosure of which is incorporated by reference.

TECHNICAL FIELD

The present invention relates to a method of controlling a hybrid drive system for a road vehicle.

PRIOR ART

A hybrid drive system for a road vehicle comprises an internal combustion heat engine, which transmits the driving torque to the drive wheels by means of a transmission provided with a gearbox, and at least one electric machine, which is mechanically connected to the drive wheels and electrically connected to an electric energy storage system.

Recently, a hybrid drive system has been proposed for a road vehicle, comprising an internal combustion heat engine supercharged by a turbocharger, an electric machine connected to the drive wheels (generally through the transmission line also used by the internal combustion heat engine), and a further electric machine connected to the turbocharger shaft. The electric machine connected to the drive wheels is used to provide, when necessary, a driving torque to the drive wheels (in combination with or to replace the driving torque generated by the internal combustion heat engine) or to generate electric energy by acting as a brake during deceleration of the road vehicle. The electric machine connected to the turbocharger shaft is used to accelerate the turbocharger shaft when the road vehicle is accelerating (particularly in the first moments of the acceleration so as to eliminate the typical turbo lag) or to generate electric energy when the mechanical power produced by the turbine is greater than the mechanical power absorbed by the compressor.

In the hybrid drive system described above, when the internal combustion heat engine uses the controlled ignition of the mixture (i.e. implements the Otto cycle using petrol or the like as the fuel), the control of the driving torque generated by the internal combustion heat engine comprises varying the degree of opening of the throttle valve so as to adjust the flow rate of fresh air fed to the cylinder and feeding into the cylinders a quantity of fuel that, based on a stoichiometric ratio, depends on the quantity of fresh air entering the cylinders.

The hybrid drive system described above was found to be energetically efficient when driving on city and suburban roads even when an internal combustion heat engine fueled by petrol (or similar fuels) is used instead of an internal combustion heat engine fueled by diesel oil; however, the hybrid drive system described above was also found to have lower energy efficiency when driving on motorways, when an internal combustion heat engine fueled by petrol (or similar fuels) is used instead of an internal combustion heat engine fueled by diesel oil.

Patent applications EP3088124A1 and WO2014165233A1 describe an internal combustion engine provided, on suction, with a volumetric compressor (not a turbocharger, since there are no turbines driven by exhaust gases) driven by a reversible electric machine; in some operating conditions, the intake air flow rate (and therefore, indirectly, the driving torque generated by the internal combustion engine) is adjusted (reduced) by operating the compressor arranged along the intake pipe as a turbine. However, the energy efficiency of this solution is modest as the volumetric compressor arranged along the intake pipe performs poorly when it is operated as a turbine.

DESCRIPTION OF THE INVENTION

The object of the present invention is to provide a method of controlling a hybrid drive system for a road vehicle, which control method allows the energy efficiency of the hybrid drive system to be increased when the internal combustion heat engine is fueled by petrol (or similar fuels) and when the road vehicle travels long distances at high and approximately constant speed (i.e. when driving on a motorway).

According to the present invention, a method of controlling a hybrid drive system for a road vehicle is provided as claimed in the appended claims.

The claims describe preferred embodiments of the invention forming an integral part of the present specification.

BRIEF DESCRIPTION OF THE DRAWINGS

The present invention will now be described with reference to the accompanying drawings, which illustrate a non-limiting embodiment thereof, in which.

PREFERRED EMBODIMENTS OF THE INVENTION

Figure 1:
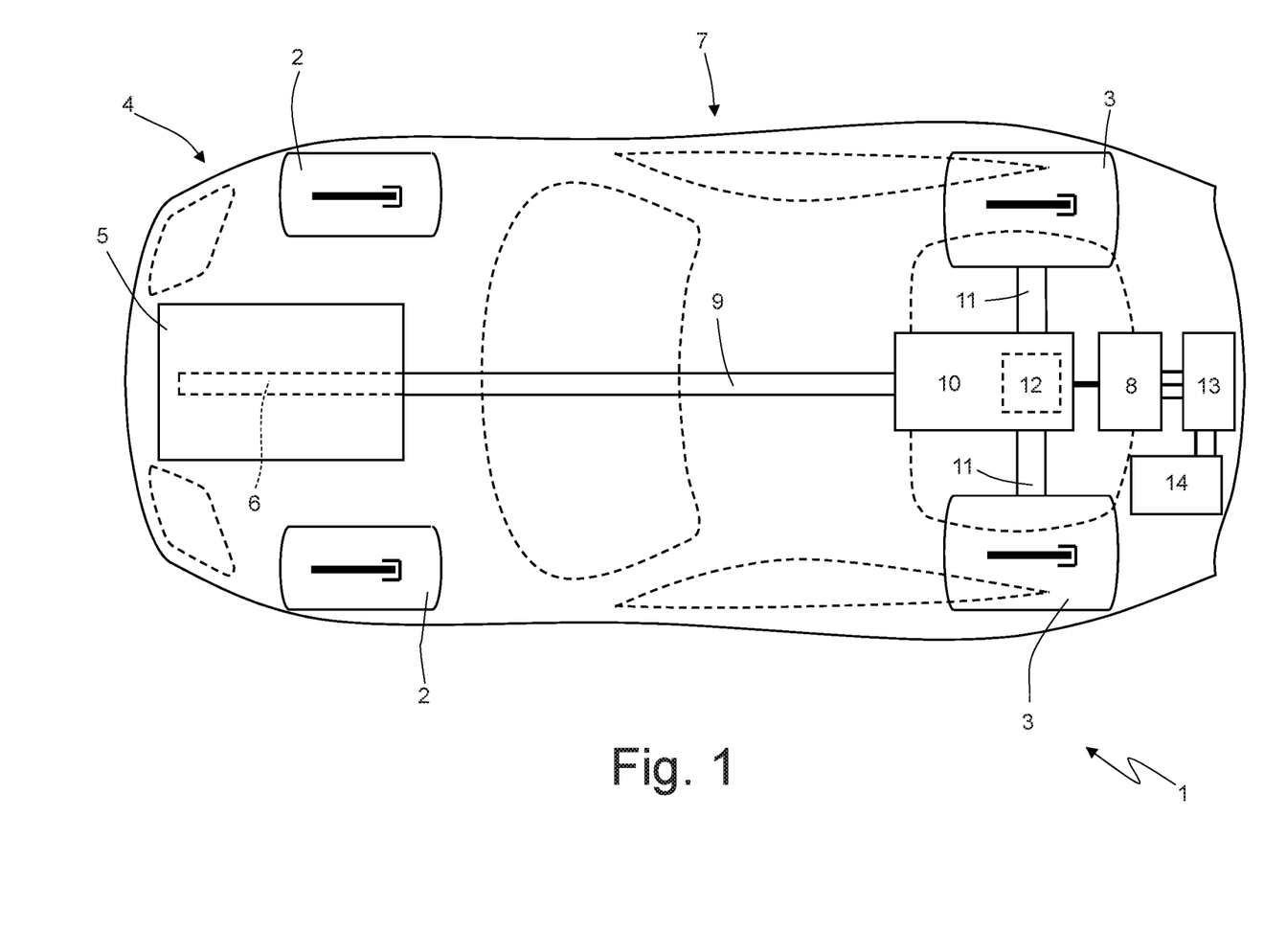
FIG. 1 is a schematic plan view of a road vehicle provided with a hybrid drive system that is controlled in accordance with the control method of the present invention.

In FIG. 1, the numeral 1 indicates, as a whole, a hybrid drive road vehicle equipped with two front wheels 2 and two rear drive wheels 3, which receive the driving torque from a hybrid drive system 4.

The hybrid drive system 4 comprises an internal combustion heat engine 5, which is arranged at the front, is provided with a drive shaft 6, and implements the Otto cycle using petrol or similar fuels as a fuel (typically LPG, methane, or ethanol or mixtures of petrol and ethanol). The hybrid drive system 4 also includes an automatic transmission 7, which transmits the driving torque generated by the internal combustion engine 5 to the rear drive wheels 3. The hybrid drive system 4 also comprises an electric machine 8, which is mechanically connected to the transmission 7 and is reversible (i.e. it can work both as an electric motor by absorbing electric energy and generating a mechanical driving torque, and as an electric generator by absorbing mechanical energy and generating electric energy).

The transmission 7 comprises a transmission shaft 9 which, on one side, is angularly integral with the drive shaft 6 and, on the other side, is mechanically connected to a servo-assisted gearbox 10, which is arranged at the back and transmits the motion to the rear drive wheels 3 by means of two axle shafts 11 that receive the motion from a differential 12. The electric machine 8 is mechanically connected to the servo-assisted gearbox 10 and, for example, is angularly integral with a primary shaft of the servo-assisted gearbox 10.

The electric machine 8 is controlled by an electronic control device 13 (in particular an electronic direct-alternating power converter, i.e. an inverter), which is electrically connected to an electrical energy storage system 14 generally provided with chemical batteries.

Figure 2:
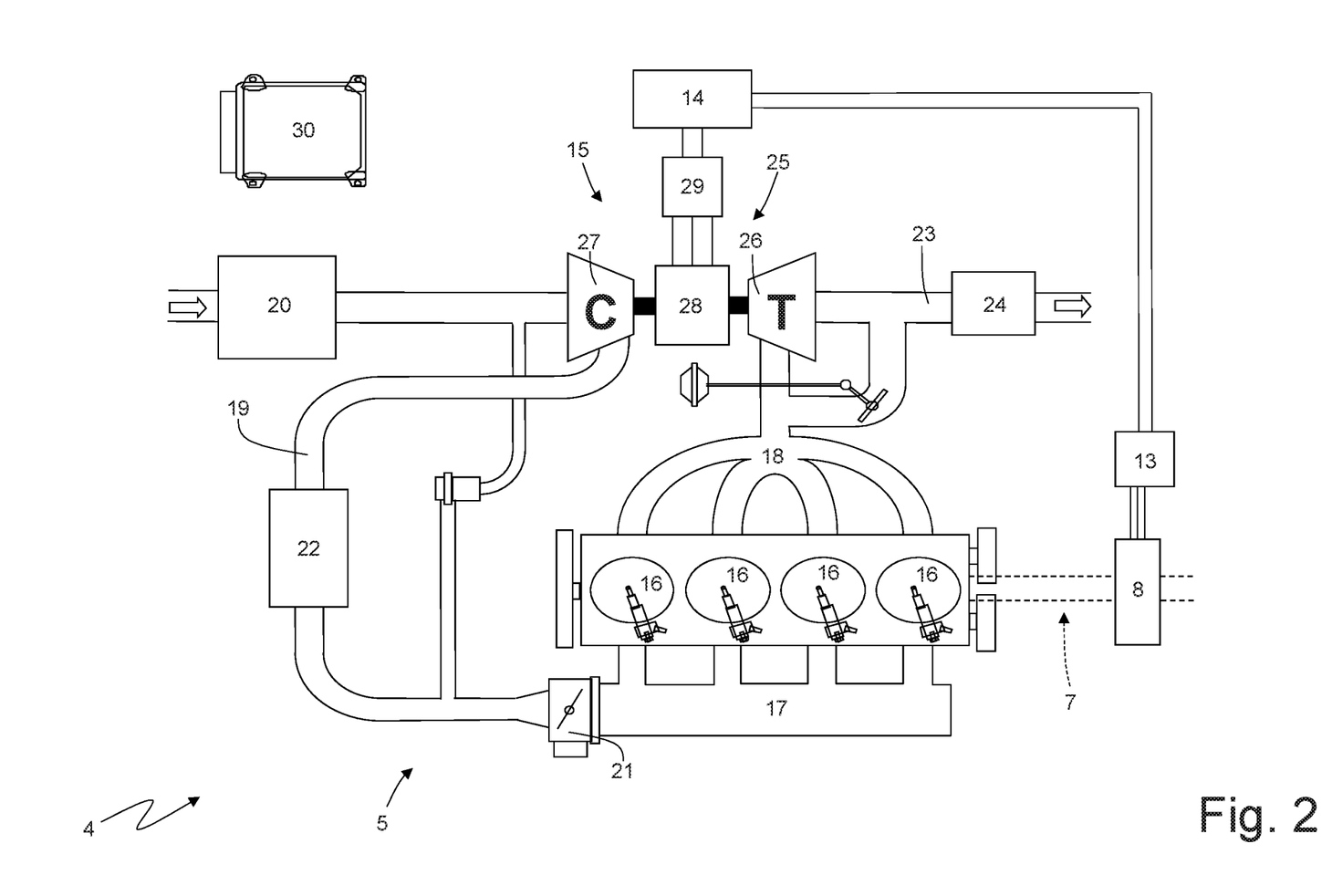
FIG. 2 is a schematic view of the hybrid drive system of FIG. 1.

As shown in FIG. 2, the internal combustion heat engine 5 is supercharged by a turbocharger supercharging system 15. In addition, the internal combustion heat engine 5 comprises four cylinders 16, each of which is connected to an intake manifold 17 via at least one respective intake valve (not shown) and to an exhaust manifold 18 via at least one respective exhaust valve (not shown); each cylinder 16 houses, on the inside, a respective piston that slides with reciprocating motion and is mechanically connected to the drive shaft 6. The intake manifold 17 receives fresh air (i.e. air from the external environment) through an intake pipe 19, which is provided with an air filter 20 and is controlled by a throttle valve 21 (i.e. the throttle valve 21 adjusts the flow rate of fresh air fed by the intake pipe 19 to the intake manifold 17). An intercooler 22, whose function is to cool the intake air, is arranged along the intake pipe 19. The exhaust manifold 18 is connected to an exhaust pipe 23 that feeds the exhaust gases produced by combustion to an exhaust system, which emits the gases produced by combustion into the atmosphere and normally comprises at least one catalyst 24 and at least one silencer (not shown) arranged downstream of the catalyst 24.

The supercharging system 15 of the internal combustion heat engine 5 comprises a turbocharger 25 provided with a turbine 26, which is arranged along the exhaust pipe 23 so as to rotate at high speed under the thrust of the exhaust gases expelled by the cylinders 16, and a compressor 27, which is arranged along the intake pipe 19 so as to increase the pressure of the air fed by the feeding pipe 19. In addition, the turbocharger 25 comprises an electric machine 28 that is mechanically connected to the shaft of the turbocharger 25 (i.e. is mechanically connected to the turbine 26 and the compressor 27) and is reversible (i.e. it can be operated as an electric motor to absorb electric energy and produce a mechanical torque or as a generator to absorb mechanical energy and produce electric energy). The electric machine 28 is electrically connected to an electronic control device 29 (in particular an electronic direct-alternating power converter, i.e. an inverter), which, in turn, is connected to the electrical energy storage system 14.

The internal combustion heat engine involves the controlled ignition of the mixture, i.e. each cylinder 16 is provided with at least one spark plug that is actuated to ignite the mixture inside the cylinder 16 itself.

In the embodiment illustrated in the attached figures, the turbocharger 25 comprises a single shaft to which the turbine 26, the compressor 27 and the electric machine 28 are keyed (i.e. the turbine 26 and compressor 27 are mutually mechanically constrained); according to a different embodiment, not shown, the turbocharger comprises a first shaft to which the turbine 26 and the electric machine 28 are keyed, and a second shaft to which the compressor 27 and a further electric machine are keyed (i.e. the turbine 26 and compressor 27 are not mutually mechanically constrained and are therefore free to rotate at different rotational speeds).

As said above, the drive shaft 6 of the internal combustion heat engine 5 is connected to the transmission 7, which transmits the driving torque generated by the internal combustion engine 5 itself to the rear driving wheels 3 and is provided with the reversible electric machine 8.

To summarize, the hybrid drive system 4 comprises three active components (i.e. able to generate mechanical power and/or electric power): the internal combustion heat engine 5 (only able to generate mechanical power) and the two electric machines 8 and 28 (able to generate mechanical power, and alternatively electric power).

The hybrid drive system 4 is controlled by an electronic control unit 30, which supervises the operation of the hybrid drive system 4 and therefore controls the internal combustion heat engine 5 and the two electric machines 8 and 28 in a coordinated manner.

The operation of the hybrid drive system 4 is described below.

The electronic control unit 30 integrates a vehicle management unit (also referred to as VMU) which receives the commands given by the driver as input and accordingly establishes the target torque and speed of rotation of the internal combustion heat engine 5 and of the two electric machines 8 and 28 to meet the driver's wishes in the most effective (i.e. ready) and energy efficient way. In particular, the electronic control unit 30 receives the position of the controls on which the driver acts (accelerator pedal, brake pedal and shift controls), as input, to acquire the wishes expressed by the driver and then translates these wishes into a target longitudinal speed (with the direction, i.e. forwards or backwards) and a target longitudinal acceleration for the road vehicle 1. Hence, the electronic control unit 30 establishes how to pursue the target longitudinal speed and the target longitudinal acceleration by coordinating the action of the internal combustion heat engine 5, the gearbox 10 and the electric machines 8 and 28, i.e. establishes a target torque $T_{TE}$ and (optionally) a target speed of rotation (targets which can also comprise null values, corresponding to the switching off of the internal combustion heat engine 5) for the internal combustion heat engine 5, establishes a target transmission ratio (which can also comprise the neutral position) for the gearbox 10, and establishes target $T_{TM1}$ and $T_{TM2}$ torques (which can be positive by providing a motor operating mode, negative by providing a generator operating mode, or null, corresponding to the switching off of the electric machines 8 and 28) and a target speed of rotation for each of the electric machines 8 or 28.

It is important to emphasize that the target speeds of rotation have a limited degree of freedom, as the speed of rotation of the internal combustion heat engine 5 and the speed of rotation of the electric machine 8 are substantially imposed by the speed of travel of the road vehicle 1 (obviously through the transmission ratio selected in the gearbox 10), whereas the speed of rotation of the electric machine 8 is substantially imposed by the speed of the exhaust gases in the exhaust pipe 23.

In use, the electronic control unit 30 establishes a target torque $T_T$ to be generated by the hybrid drive system 4 (and then transmitted to the drive wheels 3) and thus divides the target torque $T_T$ of the hybrid drive system 4 into a target torque $T_{TE}$ of the internal combustion heat engine 5 and a target torque $T_{TM1}$ of the electric machine 8; obviously, the following equation must be obeyed:

$$T_T = T_{TE} + T_{TM1}$$

bearing in mind that the torques (and therefore the target torques $T_T$, $T_{TE}$, $T_{TM1}$) can be positive (to accelerate the road vehicle 1) or negative (to decelerate, i.e. brake, the road vehicle 1). Accordingly, the electronic control unit 30 establishes a target torque $T_{TE}$ to be generated by the internal combustion heat engine 5.

At the same time, the electronic control unit 30 controls the internal combustion heat engine 5 to pursue the corresponding target torque $T_{TE}$ and controls the electric machine 8 to pursue the corresponding target torque $T_{TM1}$.

In a first operating mode ("standard", as universally diffused in the control of internal combustion heat engines with controlled ignition of the mixture), the internal combustion heat engine 5 is controlled to pursue the target torque $T_{TE}$ by varying the degree of opening of the throttle valve 21 so as to adjust the flow rate of fresh air fed to the cylinders 16 in order to vary the drive torque generated by the internal combustion heat engine 5; at the same time, a quantity of fuel that, based on a stoichiometric ratio, depends on the quantity of fresh air entering the cylinders 16, is fed into the cylinders 16 so that the combustion in the cylinders 16 always occurs under stoichiometric conditions.

In a second operating mode ("innovative", as never used before in internal combustion heat engines with controlled ignition of the mixture), the internal combustion heat engine 5 is controlled to pursue the target torque $T_{TE}$ by completely opening the throttle valve 21 and always keeping it completely open, operating the electric machine 28 as an electric generator so as to absorb torque from the turbine 26, operating the electric machine 8 as a motor so as to deliver torque to the drive wheels 3, and varying the electric power generated by the electric machine 28, so as to adjust the flow rate of fresh air fed to the cylinders 16 in order to vary the drive torque generated by the internal combustion heat engine 5; at the same time, a quantity of fuel that, based on a stoichiometric ratio, depends on the quantity of fresh air entering the cylinders 16, is fed into the cylinders 16 so that the combustion in the cylinders 16 always occurs under stoichiometric conditions.

In other words, in the second operating mode, the combustion in the cylinders 16 is always carried out under stoichiometric conditions and therefore the amount of fuel fed into the cylinders 16 is always established as a function of the amount of fresh air entering said cylinders 16; however, the amount of fresh air entering the cylinders 16 (and therefore the driving torque generated by the combustion in the cylinders 16) is not adjusted by varying the degree of opening of the throttle valve 21 (i.e., "by throttling" the intake pipe 17), but instead is adjusted by varying the exhaust back-pressure generated by the turbine 26 (i.e., "by throttling" the exhaust pipe 23) via the electric power generated by the electric machine 28. In fact, increasing the electric power generated by the electric machine 28 increases the amount of energy removed by the turbine 26 from the exhaust gases in the exhaust pipe 23, consequently the exhaust back-pressure generated by the turbine 26 increases, and consequently the amount of fresh air entering the cylinders 16 decreases; similarly, decreasing the electric power generated by the electric machine 28 decreases the amount of energy removed by the turbine 26 from the exhaust gases in the exhaust pipe 23, consequently the exhaust back-pressure generated by the turbine 26 decreases, and consequently the amount of fresh air entering the cylinders 16 increases.

Thus, in the second operating mode, the throttle valve 21 is not used and is always kept in the maximum opening position to minimize load loss in the intake pipe 19 since the amount of fresh air entering the cylinders 16 is totally regulated by adjusting the electric power generated by the electric machine 28 (i.e. adjusting the exhaust back-pressure generated by the turbine 26).

In the second operating mode, the electric power absorbed by the electric machine 8 is established based on the electric power generated by the electric machine 28. In particular, in the second operating mode, the electric machine 8 is controlled so as to absorb an electric power that is equal to the electric power generated by the electric machine 28 minus the electric power absorbed by auxiliary services and minus/plus the electric power exchanged with the electrical energy storage system 14. In other words, to avoid (if not for limited periods of time) an excess or a shortage of electric energy, the electric machine 8 must absorb all and only the "available" electric power, i.e. all and only the electric power generated by the electric machine 28 minus the electric power absorbed by auxiliary services; obviously, for short periods, a part of the electric power generated by the electric machine 28 can be absorbed by the storage system 14 or, for short periods, the storage system 14 may transfer electric power (so as to always maintain the charge level of the storage system 14 at an optimal value), but normally, for most of the time, the storage system 14 is not operated and the electric machine 8 absorbs all and only the electric power generated by the electric machine 28 minus the electric power absorbed by auxiliary services.

The first operating mode can always be used, i.e. it can be used under all operating conditions of the hybrid drive system 4; instead, the second operating mode can only be used under certain operating conditions of the hybrid drive system 4, in particular when the total power requested of the hybrid drive system 4 exceeds a threshold TH1 for a length of time exceeding a second threshold TH2, i.e. when the total power requested of the drive system 4 is permanently higher than the threshold TH1; how to establish the threshold TH1 is described below, while the threshold TH2 can be, for example, between 4 and 20 seconds. In other words, the exhaust back-pressure generated by the turbine 26 can be used effectively and efficiently to adjust the amount of fresh air entering the cylinders 16 only if a relatively high average flow rate of fresh air enters the cylinders 16 and if the speed of rotation is sufficiently high; moreover, the shift from the first operating mode to the second operating mode and vice versa requires a certain amount of time and is not convenient if performed too frequently.

Figure 3:
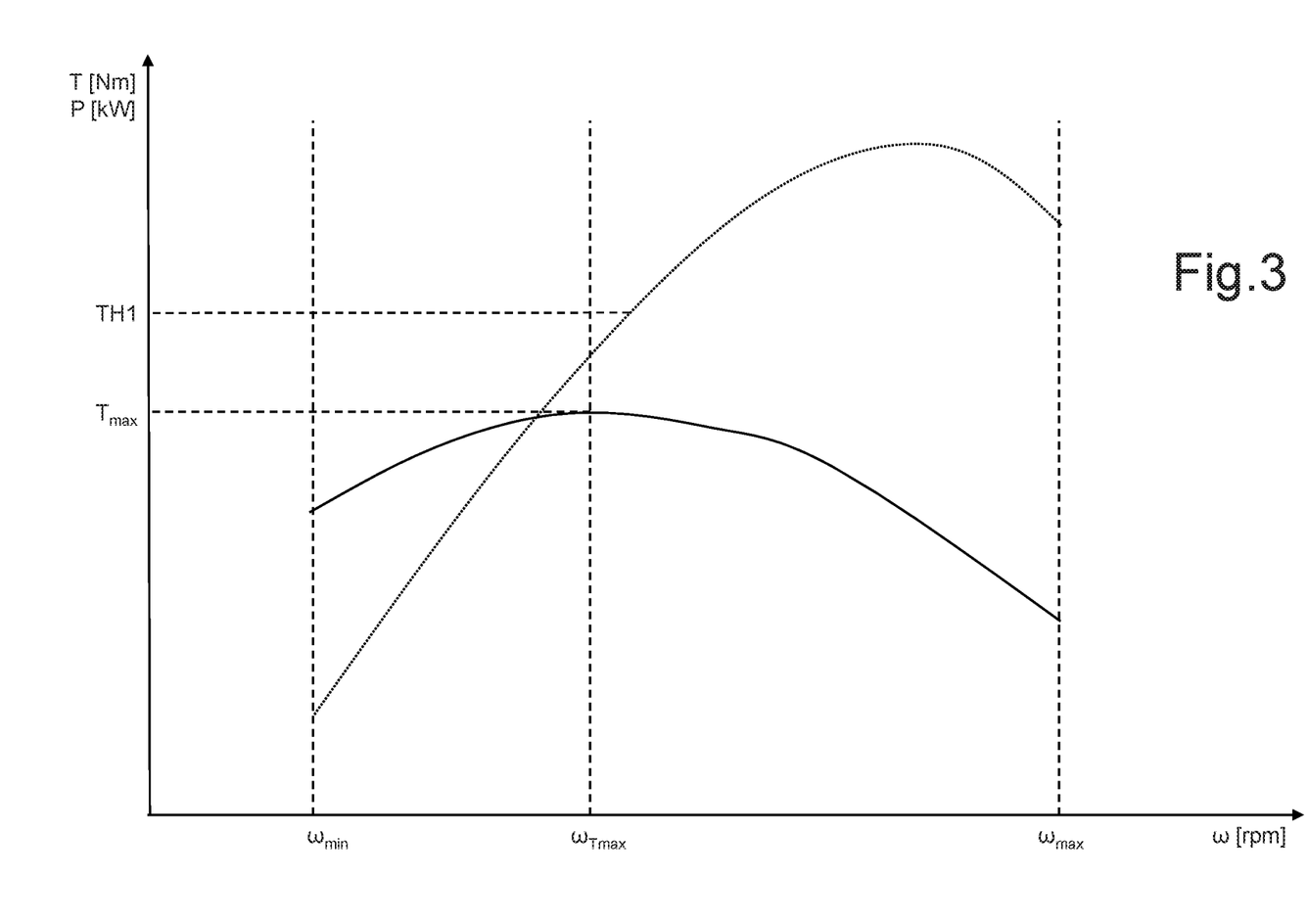
FIG. 3 is a diagram showing the characteristic torque curve and the characteristic power curve of an internal combustion heat engine of the hybrid drive system of FIG. 1.

From the characteristic driving torque curve (shown with a solid line in the graph of FIG. 3) and the characteristic power curve (shown with a dotted line in the graph of FIG. 3) of the internal combustion heat engine 5, it can be seen that the speed of rotation of the internal combustion heat engine 5 ranges from a minimum value $\omega_{min}$ to a maximum value $\omega_{max}$ and that the torque generated by the internal combustion heat engine 5 initially increases as the speed of rotation increases, until a maximum value $T_{max}$ is reached at a speed of rotation $\omega_{Tmax}$ of the maximum torque, and decreases as the speed of rotation increases subsequent to the speed of rotation $\omega_{Tmax}$ of the maximum torque. The second operating mode is only possible when the actual rotational speed of the internal combustion heat engine 5 is higher than the speed of rotation $\omega_{Tmax}$ of the maximum torque, i.e. only when the driving torque generated by the internal combustion heat engine 5 is less than the maximum value $T_{max}$ and decreases as the speed of rotation increases; accordingly, the threshold TH1 must be (suitably) higher than the power value generated at the speed of rotation $\omega_{Tmax}$ of the maximum torque (the threshold TH1 cannot be too close to the power value generated at the speed of rotation $\omega_{Tmax}$ of the maximum torque to avoid operating too close to the speed of rotation $\omega_{Tmax}$ of the maximum torque).

From the above, it appears that the hybrid drive system 4 is always started by using the first operating mode, and that the second operating mode is used instead of the first operating mode only under certain conditions (described above). From the point of view of the road vehicle 1, the second operating mode is substantially used when the road vehicle 1 is travelling on a motorway, i.e. when it travels long distances at high and approximately constant speed; in this respect, it is important to note that the decision to use the second operating mode can be taken not only considering the current operational status of the hybrid drive system 4, but also the path (determined by a cartographic GPS device on board the road vehicle 1) on which the road vehicle 1 is located: if the cartographic GPS device reveals that the road vehicle 1 has just entered a stretch of motorway (or similar), the second operating mode can be activated as soon as possible (i.e. restricting or cancelling the threshold TH2), whereas, if the cartographic GPS device reveals that the road vehicle 1 is in urban areas, the second operating mode can be irrespectively disabled.

According to a preferred embodiment, in the second operating mode, the fast adjustment of the torque generated by the hybrid drive system 4 is carried out by varying the torque generated by the electric machine 8, and the slow adjustment of the torque generated by the hybrid drive system 4 is carried out by varying the torque generated by the internal combustion heat engine 5; in other words, when the target torque $T_T$ to be generated by the hybrid drive system 4 undergoes a variation, this variation is obtained by rapidly varying the target torque $T_{TM1}$ of the electric machine 8 and slowly varying the target torque $T_{TE}$ of the internal combustion heat engine 5, i.e. by initially causing the variation to be absorbed entirely (obviously as far as possible) by the electric machine 8 (which responds much more quickly and can also be overloaded for short instants of time) and transferring the absorption of the variation more slowly from the electric machine 8 to the internal combustion heat engine 5. As a numerical example, let us suppose that under certain conditions the target torque $T_T$ to be generated by the hybrid drive system 4 is 70 Nm, that the target torque $T_{TM1}$ of the electric machine 8 is 15 Nm, that the target torque $T_{TE}$ of the internal combustion heat engine 5 is 55 Nm; and that at a certain moment the target torque $T_T$ to be generated by the hybrid drive system 4 passes from 70 Nm to 80 Nm (for example to perform an overtaking maneuvers or for the presence of a slope): the target torque $T_{TM1}$ of the electric machine 8 is immediately brought to 25 Nm (in less than a tenth of a second) and then is slowly lowered to 18 Nm (in a few seconds) while the target torque $T_{TE}$ of the internal combustion heat engine 5 is slowly increased from 55 Nm to 62 Nm (in a few seconds).

By operating as described above (i.e. slowly varying the target torque $T_{TE}$ of the internal combustion heat engine 5), in the transitional phases, it may happen that the electric machine 8 absorbs a different (greater or lesser) electric power than the electric power generated by the electric machine 28; obviously, this difference is always compensated for by the electrical energy storage system 14.

It is preferable to operate as described above (i.e. by slowly varying the target torque $T_{TE}$ of the internal combustion heat engine 5) because controlling the flow rate of fresh air fed to the cylinders 16 by controlling the back-pressure of the turbine 26 is relatively slow and therefore would not be able to pursue without delay a target torque $T_{TE}$ of the internal combustion heat engine 5 that varies too quickly. On the contrary, the electric machine 8 is also capable of pursuing without delay a target torque $T_{TM1}$ that varies very quickly (i.e. with significant variations of torque even within fractions of a second).

According to a preferred non-limiting embodiment, the ratio between the rated power of the internal combustion heat engine 5 and the rated power of the electric machine 28 is between 5 and 6, whereas the ratio between the rated power of the internal combustion heat engine 5 and the rated power of the electric machine 8 is between 3 and 4.5. By way of example, the rated power of the internal combustion heat engine 5 may be approximately 110 kW, the rated power of the electric machine 28 may be approximately 20 kW, and the rated power of the electric machine 8 may be approximately 30 kW.

Figure 4:
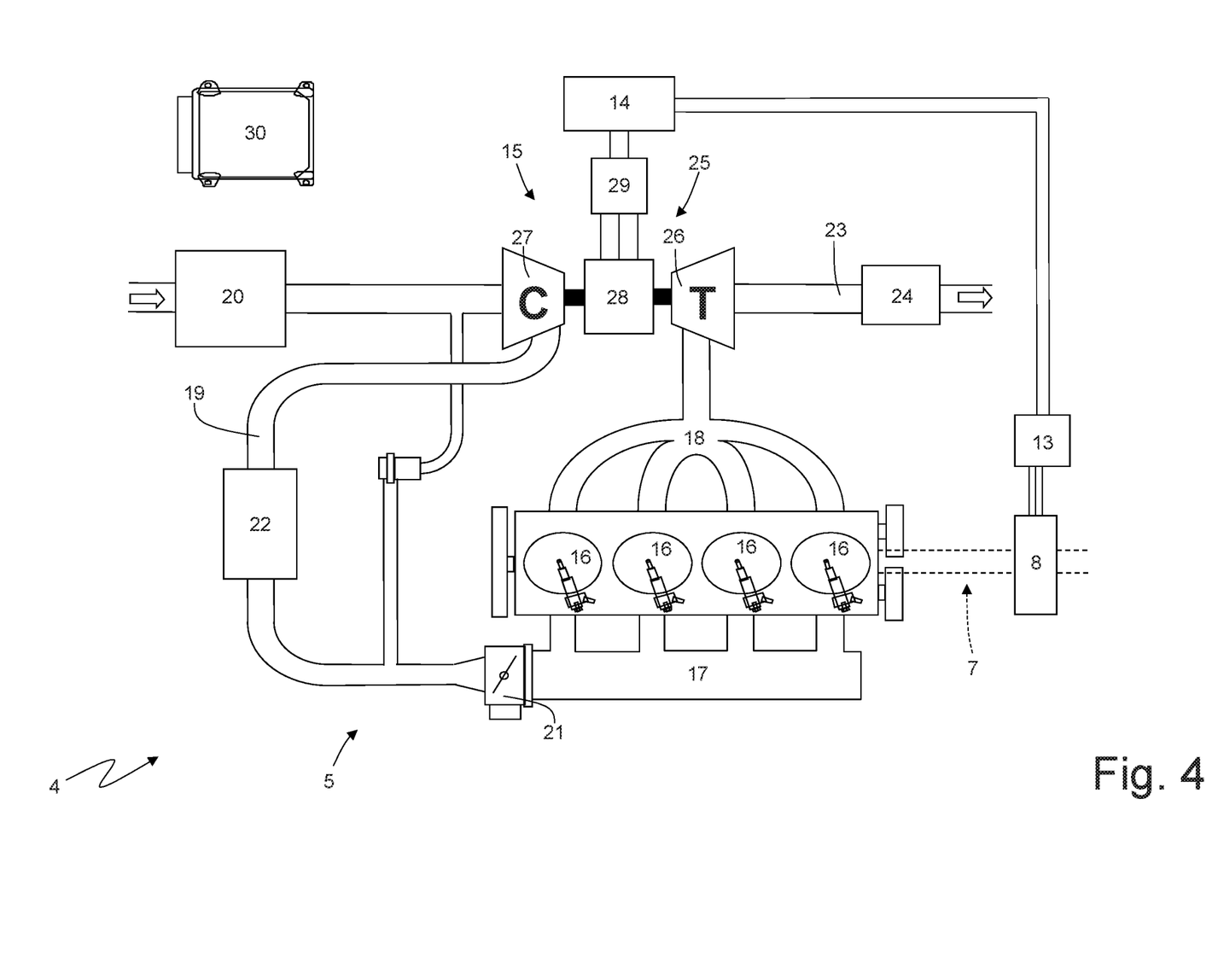
FIG. 4 is a schematic view of one variant of the hybrid drive system of FIG. 1.

In the embodiment shown in FIG. 2, the supercharging system 15 provides a pop-off valve (or a blow-off valve), which bypasses the compressor 27 and is used to control and/or limit the maximum pressure exerted by the compressor 27 itself. Moreover, in the embodiment shown in FIG. 2, the supercharging system 15 also provides a wastegate valve, which bypasses the turbine 26 to limit the maximum pressure upstream of the turbine 26. The wastegate valve is redundant and is provided solely as an emergency back-up (replacement), since the function of the wastegate valve is normally performed by the electric machine 28 which always provides for limiting the maximum pressure upstream of the turbine 26. In fact, in the alternative embodiment shown in FIG. 4, the supercharging system 15 has no wastegate valve.

In the embodiment illustrated in the attached figures, the internal combustion heat engine 5 has four cylinders 16 arranged in-line; according to other, perfectly equivalent embodiments, not shown, the internal combustion heat engine 5 has a different number of cylinders 16 and/or exhibits a different arrangement of the cylinders 16.

The embodiments described herein may be combined with each other without departing from the scope of protection of the present invention.

The above-described method of controlling the hybrid drive system 4 has numerous advantages.

Firstly, the above-described method of controlling the hybrid drive system 4 allows, when the second operating mode is used, very high energy efficiency values (close to, if not even higher than, 50%) even when an internal combustion heat engine 5 fueled by petrol (or similar fuels) is used.

In addition, the above-described control method allows the internal combustion heat engine 5 to be controlled in a simple and effective way even in the second operating mode.

Lastly, the above-described method of control of the hybrid drive system 4, even in the second operating mode, does not subject the internal combustion heat engine 5 to stress and/or higher-than-normal wear.

LIST OF REFERENCE NUMBERS IN THE FIGURES

1 vehicle
2 front wheels
3 rear wheels
4 drive system
5 heat engine
6 drive shaft
7 transmission
8 main electric machine
9 transmission shaft 10 manual gearbox
11 axle shafts
12 differential
13 electronic control device
14 storage system
15 supercharging system
16 cylinders
17 intake manifold
18 exhaust manifold
19 intake pipe
20 air filter
21 throttle valve
22 intercooler
23 exhaust pipe
24 catalyst
25 turbocharger
26 turbine
27 compressor
28 electric machine
29 control device
30 electronic control unit

The invention claimed is:

1. A method to control a hybrid drive system (4) for a road vehicle (1) comprising at least a pair of drive wheels (3); the hybrid drive system (4) comprises:
an internal combustion heat engine (5), which is designed to transmit the motion to the drive wheels (3) and comprises at least one cylinder (16), an intake manifold (17), which is connected to the cylinder (16) through at least one intake valve, an exhaust manifold (18), which is connected to the cylinder (16) through at least one exhaust valve, an intake pipe (19), which feeds fresh air to the intake manifold (17), a throttle valve (21), which adjusts the flow rate of fresh air fed by the intake pipe (19) to the intake manifold (17), an exhaust pipe (23), which is connected to the exhaust manifold (18), and a turbocharger (25), which is provided with a turbine (26) arranged along the exhaust pipe (23) so as to rotate under the thrust of the exhaust gases expelled by the cylinder (16), and with a compressor (27) arranged along the intake pipe (19) so as to increase the pressure of the air fed by the intake pipe (19);
a first electric machine (8), which is able to transmit the motion to the drive wheels (3) and is controlled by a first electronic control device (13) electrically connected to an electrical energy storage system (14); and
a second electric machine (28), which is mechanically connected to the turbine (26) of the turbocharger (25) and is controlled by a second electronic control device (29) electrically connected to the electrical energy storage system (14);
the control method comprises the steps of:
establishing a target torque (TTE) to be generated by the internal combustion heat engine (5); and
controlling the internal combustion heat engine (5) so as to pursue the target torque (TTE);
wherein, in a first operating mode, the step of controlling the internal combustion heat engine (5) so as to pursue the target torque (TTE) comprises the further steps of:
varying the degree of opening of the throttle valve (21) so as to adjust the flow rate of fresh air fed to the cylinder (16) in order to vary the torque generated by the internal combustion heat engine (5); and
feeding into the cylinder (16) a quantity of fuel that, based on a stoichiometric ratio, depends on the quantity of fresh air entering the cylinder (16);
wherein, in a second operating mode, the step of controlling the internal combustion heat engine (5) so as to pursue the target torque (TTE) comprises the further steps of:
completely opening the throttle valve (21) and always keeping it completely open;
operating the second electric machine (28) as an electric generator so as to absorb torque from the turbine (26);
operating the first electric machine (8) as a motor so as to deliver torque to the drive wheels (3);
varying the electric power generated by the second electric machine (28) so as to adjust the flow rate of fresh air fed to the cylinder (16) in order to vary the torque generated by the internal combustion heat engine (5); and
feeding into the cylinder (16) a quantity of fuel that, based on a stoichiometric ratio, depends on the quantity of fresh air entering the cylinder (16);
wherein, in the second operating mode, the electric power absorbed by the first electric machine (8) is established based on the electric power generated by the second electric machine (28).

2. The control method according to claim 1, wherein, in the second operating mode, the first electric machine (8) is controlled so as to absorb an electric power that is equal to the electric power generated by the second electric machine (28) minus the electric power absorbed by auxiliary services and minus/plus the electric power exchanged with the electrical energy storage system (14).

3. The control method according to claim 1, wherein the second operating mode is used when the total power requested of the hybrid drive system (4) exceeds a first threshold (TH1).

4. The control method according to claim 3, wherein the second operating mode is used when the total power requested of the hybrid drive system (4) exceeds the first threshold (TH1) for an amount of time exceeding a second threshold (TH2).

5. A method to control a hybrid drive system (4) for a road vehicle (1) comprising at least a pair of drive wheels (3); the hybrid drive system (4) comprises:
an internal combustion heat engine (5), which is designed to transmit the motion to the drive wheels (3) and comprises at least one cylinder (16), an intake manifold (17), which is connected to the cylinder (16) through at least one intake valve, an exhaust manifold (18), which is connected to the cylinder (16) through at least one exhaust valve, an intake pipe (19), which feeds fresh air to the intake manifold (17), a throttle valve (21), which adjusts the flow rate of fresh air fed by the intake pipe (19) to the intake manifold (17), an exhaust pipe (23), which is connected to the exhaust manifold (18), and a turbocharger (25), which is provided with a turbine (26) arranged along the exhaust pipe (23) so as to rotate under the thrust of the exhaust gases expelled by the cylinder (16), and with a compressor (27) arranged along the intake pipe (19) so as to increase the pressure of the air fed by the intake pipe (19);
a first electric machine (8), which is able to transmit the motion to the drive wheels (3) and is controlled by a first electronic control device (13) electrically connected to an electrical energy storage system (14); and
a second electric machine (28), which is mechanically connected to the turbine (26) of the turbocharger (25) and is controlled by a second electronic control device (29) electrically connected to the electrical energy storage system (14);

the control method comprises the steps of:
establishing a target torque (TTE) to be generated by the internal combustion heat engine (5); and
controlling the internal combustion heat engine (5) so as to pursue the target torque (TTE);
wherein, in a first operating mode, the step of controlling the internal combustion heat engine (5) so as to pursue the target torque (TTE) comprises the further steps of:
varying the degree of opening of the throttle valve (21) so as to adjust the flow rate of fresh air fed to the cylinder (16) in order to vary the torque generated by the internal combustion heat engine (5); and
feeding into the cylinder (16) a quantity of fuel that, based on a stoichiometric ratio, depends on the quantity of fresh air entering the cylinder (16);
wherein, in a second operating mode, the step of controlling the internal combustion heat engine (5) so as to pursue the target torque (TTE) comprises the further steps of:
completely opening the throttle valve (21) and always keeping it completely open;
operating the second electric machine (28) as an electric generator so as to absorb torque from the turbine (26);
operating the first electric machine (8) as a motor so as to deliver torque to the drive wheels (3);
varying the electric power generated by the second electric machine (28) so as to adjust the flow rate of fresh air fed to the cylinder (16) in order to vary the torque generated by the internal combustion heat engine (5); and
feeding into the cylinder (16) a quantity of fuel that, based on a stoichiometric ratio, depends on the quantity of fresh air entering the cylinder (16);
wherein the second operating mode is used when the total power requested of the hybrid drive system (4) exceeds a first threshold (TH1).

6. The control method according to claim 5, wherein the second operating mode is used when the total power requested of the hybrid drive system (4) exceeds the first threshold (TH1) for an amount of time exceeding a second threshold (TH2).

7. A method to control a hybrid drive system (4) for a road vehicle (1) comprising at least a pair of drive wheels (3);
the hybrid drive system (4) comprises:
an internal combustion heat engine (5), which is designed to transmit the motion to the drive wheels (3) and comprises at least one cylinder (16), an intake manifold (17), which is connected to the cylinder (16) through at least one intake valve, an exhaust manifold (18), which is connected to the cylinder (16) through at least one exhaust valve, an intake pipe (19), which feeds fresh air to the intake manifold (17), a throttle valve (21), which adjusts the flow rate of fresh air fed by the intake pipe (19) to the intake manifold (17), an exhaust pipe (23), which is connected to the exhaust manifold (18), and a turbocharger (25), which is provided with a turbine (26) arranged along the exhaust pipe (23) so as to rotate under the thrust of the exhaust gases expelled by the cylinder (16), and with a compressor (27) arranged along the intake pipe (19) so as to increase the pressure of the air fed by the intake pipe (19);
a first electric machine (8), which is able to transmit the motion to the drive wheels (3) and is controlled by a first electronic control device (13) electrically connected to an electrical energy storage system (14); and
a second electric machine (28), which is mechanically connected to the turbine (26) of the turbocharger (25) and is controlled by a second electronic control device (29) electrically connected to the electrical energy storage system (14);
the control method comprises the steps of:
establishing a target torque (TTE) to be generated by the internal combustion heat engine (5); and
controlling the internal combustion heat engine (5) so as to pursue the target torque (TTE);
wherein, in a first operating mode, the step of controlling the internal combustion heat engine (5) so as to pursue the target torque (TTE) comprises the further steps of:
varying the degree of opening of the throttle valve (21) so as to adjust the flow rate of fresh air fed to the cylinder (16) in order to vary the torque generated by the internal combustion heat engine (5); and
feeding into the cylinder (16) a quantity of fuel that, based on a stoichiometric ratio, depends on the quantity of fresh air entering the cylinder (16);
wherein, in a second operating mode, the step of controlling the internal combustion heat engine (5) so as to pursue the target torque (TTE) comprises the further steps of:
completely opening the throttle valve (21) and always keeping it completely open;
operating the second electric machine (28) as an electric generator so as to absorb torque from the turbine (26);
operating the first electric machine (8) as a motor so as to deliver torque to the drive wheels (3);
varying the electric power generated by the second electric machine (28) so as to adjust the flow rate of fresh air fed to the cylinder (16) in order to vary the torque generated by the internal combustion heat engine (5); and
feeding into the cylinder (16) a quantity of fuel that, based on a stoichiometric ratio, depends on the quantity of fresh air entering the cylinder (16);
wherein, in the second operating mode, the electric power generated by the second electric machine (28) is increased in order to decrease the flow rate of fresh air fed to the cylinder (16) and, hence, decrease the torque generated by the internal combustion heat engine (5) and vice versa.

8. A method to control a hybrid drive system (4) for a road vehicle (1) comprising at least a pair of drive wheels (3);
the hybrid drive system (4) comprises:
an internal combustion heat engine (5), which is designed to transmit the motion to the drive wheels (3) and comprises at least one cylinder (16), an intake manifold (17), which is connected to the cylinder (16) through at least one intake valve, an exhaust manifold (18), which is connected to the cylinder (16) through at least one exhaust valve, an intake pipe (19), which feeds fresh air to the intake manifold (17), a throttle valve (21), which adjusts the flow rate of fresh air fed by the intake pipe (19) to the intake manifold (17), an exhaust pipe (23), which is connected to the exhaust manifold (18), and a turbocharger (25), which is provided with a turbine (26) arranged along the exhaust pipe (23) so as to rotate under the thrust of the exhaust gases expelled by the cylinder (16), and with a compressor (27) arranged along the intake pipe (19) so as to increase the pressure of the air fed by the intake pipe (19);
a first electric machine (8), which is able to transmit the motion to the drive wheels (3) and is controlled by a first electronic control device (13) electrically connected to an electrical energy storage system (14); and a second electric machine (28), which is mechanically connected to the turbine (26) of the turbocharger (25) and is controlled by a second electronic control device (29) electrically connected to the electrical energy storage system (14);

the control method comprises the steps of:

establishing a target torque (TTE) to be generated by the internal combustion heat engine (5); and controlling the internal combustion heat engine (5) so as to pursue the target torque (TTE);

wherein, in a first operating mode, the step of controlling the internal combustion heat engine (5) so as to pursue the target torque (TTE) comprises the further steps of:

varying the degree of opening of the throttle valve (21) so as to adjust the flow rate of fresh air fed to the cylinder (16) in order to vary the torque generated by the internal combustion heat engine (5); and feeding into the cylinder (16) a quantity of fuel that, based on a stoichiometric ratio, depends on the quantity of fresh air entering the cylinder (16);

wherein, in a second operating mode, the step of controlling the internal combustion heat engine (5) so as to pursue the target torque (TTE) comprises the further steps of:

completely opening the throttle valve (21) and always keeping it completely open;

operating the second electric machine (28) as an electric generator so as to absorb torque from the turbine (26);

operating the first electric machine (8) as a motor so as to deliver torque to the drive wheels (3);

varying the electric power generated by the second electric machine (28) so as to adjust the flow rate of fresh air fed to the cylinder (16) in order to vary the torque generated by the internal combustion heat engine (5); and feeding into the cylinder (16) a quantity of fuel that, based on a stoichiometric ratio, depends on the quantity of fresh air entering the cylinder (16);

wherein the hybrid drive system (4) is always started by using the first operating mode.

9. The control method according to claim 8, wherein the second operating mode is used instead of the first operating mode only in given conditions.

10. A method to control a hybrid drive system (4) for a road vehicle (1) comprising at least a pair of drive wheels (3);

the hybrid drive system (4) comprises:

an internal combustion heat engine (5), which is designed to transmit the motion to the drive wheels (3) and comprises at least one cylinder (16), an intake manifold (17), which is connected to the cylinder (16) through at least one intake valve, an exhaust manifold (18), which is connected to the cylinder (16) through at least one exhaust valve, an intake pipe (19), which feeds fresh air to the intake manifold (17), a throttle valve (21), which adjusts the flow rate of fresh air fed by the intake pipe (19) to the intake manifold (17), an exhaust pipe (23), which is connected to the exhaust manifold (18), and a turbocharger (25), which is provided with a turbine (26) arranged along the exhaust pipe (23) so as to rotate under the thrust of the exhaust gases expelled by the cylinder (16), and with a compressor (27) arranged along the intake pipe (19) so as to increase the pressure of the air fed by the intake pipe (19);

a first electric machine (8), which is able to transmit the motion to the drive wheels (3) and is controlled by a first electronic control device (13) electrically connected to an electrical energy storage system (14); and a second electric machine (28), which is mechanically connected to the turbine (26) of the turbocharger (25) and is controlled by a second electronic control device (29) electrically connected to the electrical energy storage system (14);

the control method comprises the steps of:

establishing a target torque (TTE) to be generated by the internal combustion heat engine (5); and controlling the internal combustion heat engine (5) so as to pursue the target torque (TTE);

wherein, in a first operating mode, the step of controlling the internal combustion heat engine (5) so as to pursue the target torque (TTE) comprises the further steps of:

varying the degree of opening of the throttle valve (21) so as to adjust the flow rate of fresh air fed to the cylinder (16) in order to vary the torque generated by the internal combustion heat engine (5); and feeding into the cylinder (16) a quantity of fuel that, based on a stoichiometric ratio, depends on the quantity of fresh air entering the cylinder (16);

wherein, in a second operating mode, the step of controlling the internal combustion heat engine (5) so as to pursue the target torque (TTE) comprises the further steps of:

completely opening the throttle valve (21) and always keeping it completely open;

operating the second electric machine (28) as an electric generator so as to absorb torque from the turbine (26);

operating the first electric machine (8) as a motor so as to deliver torque to the drive wheels (3);

varying the electric power generated by the second electric machine (28) so as to adjust the flow rate of fresh air fed to the cylinder (16) in order to vary the torque generated by the internal combustion heat engine (5); and feeding into the cylinder (16) a quantity of fuel that, based on a stoichiometric ratio, depends on the quantity of fresh air entering the cylinder (16);

wherein the second operating mode is used when the road vehicle (1) is driving on a highway.

11. A method to control a hybrid drive system (4) for a road vehicle (1) comprising at least a pair of drive wheels (3);

the hybrid drive system (4) comprises:

an internal combustion heat engine (5), which is designed to transmit the motion to the drive wheels (3) and comprises at least one cylinder (16), an intake manifold (17), which is connected to the cylinder (16) through at least one intake valve, an exhaust manifold (18), which is connected to the cylinder (16) through at least one exhaust valve, an intake pipe (19), which feeds fresh air to the intake manifold (17), a throttle valve (21), which adjusts the flow rate of fresh air fed by the intake pipe (19) to the intake manifold (17), an exhaust pipe (23), which is connected to the exhaust manifold (18), and a turbocharger (25), which is provided with a turbine (26) arranged along the exhaust pipe (23) so as to rotate under the thrust of the exhaust gases expelled by the cylinder (16), and with a compressor (27) arranged along the intake pipe (19) so as to increase the pressure of the air fed by the intake pipe (19);

a first electric machine (8), which is able to transmit the motion to the drive wheels (3) and is controlled by a first electronic control device (13) electrically connected to an electrical energy storage system (14); and a second electric machine (28), which is mechanically connected to the turbine (26) of the turbocharger (25) and is controlled by a second electronic control device (29) electrically connected to the electrical energy storage system (14);

the control method comprises the steps of:

establishing a target torque (TTE) to be generated by the internal combustion heat engine (5); and controlling the internal combustion heat engine (5) so as to pursue the target torque (TTE);

wherein, in a first operating mode, the step of controlling the internal combustion heat engine (5) so as to pursue the target torque (TTE) comprises the further steps of:

varying the degree of opening of the throttle valve (21) so as to adjust the flow rate of fresh air fed to the cylinder (16) in order to vary the torque generated by the internal combustion heat engine (5); and feeding into the cylinder (16) a quantity of fuel that, based on a stoichiometric ratio, depends on the quantity of fresh air entering the cylinder (16);

wherein, in a second operating mode, the step of controlling the internal combustion heat engine (5) so as to pursue the target torque (TTE) comprises the further steps of:

completely opening the throttle valve (21) and always keeping it completely open;

operating the second electric machine (28) as an electric generator so as to absorb torque from the turbine (26);

operating the first electric machine (8) as a motor so as to deliver torque to the drive wheels (3);

varying the electric power generated by the second electric machine (28) so as to adjust the flow rate of fresh air fed to the cylinder (16) in order to vary the torque generated by the internal combustion heat engine (5); and feeding into the cylinder (16) a quantity of fuel that, based on a stoichiometric ratio, depends on the quantity of fresh air entering the cylinder (16);

wherein, in the second operating mode, the fast adjustment of the torque generated by the hybrid drive system (4) is carried out by varying the torque generated by the first electric machine (8), and the slow adjustment of the torque generated by the hybrid drive system (4) is carried out by varying the torque generated by the internal combustion heat engine (5).

12. The control method according to claim 11 and comprising, in the second operating mode, the further steps of:

establishing a target torque (TT) to be generated by the hybrid drive system (4);

dividing the target torque (TT) of the hybrid drive system (4) into a target torque (TTE) of the internal combustion heat engine (5) and a target torque (TTM1) of the first electric machine (8); and in case of change of the target torque of the hybrid drive system (4), varying the target torque (TTM1) of the first electric machine (8) faster and varying the target torque (TTE) of the internal combustion heat engine (5) slower.

13. The control method according to claim 1, wherein the internal combustion heat engine (5) implements the Otto cycle and involves the controlled ignition of the mixture in the cylinder (16).

14. A method to control a hybrid drive system (4) for a road vehicle (1) comprising at least a pair of drive wheels (3);

the hybrid drive system (4) comprises:

an internal combustion heat engine (5), which is designed to transmit the motion to the drive wheels (3) and comprises at least one cylinder (16), an intake manifold (17), which is connected to the cylinder (16) through at least one intake valve, an exhaust manifold (18), which is connected to the cylinder (16) through at least one exhaust valve, an intake pipe (19), which feeds fresh air to the intake manifold (17), a throttle valve (21), which adjusts the flow rate of fresh air fed by the intake pipe (19) to the intake manifold (17), an exhaust pipe (23), which is connected to the exhaust manifold (18), and a turbocharger (25), which is provided with a turbine (26) arranged along the exhaust pipe (23) so as to rotate under the thrust of the exhaust gases expelled by the cylinder (16), and with a compressor (27) arranged along the intake pipe (19) so as to increase the pressure of the air fed by the intake pipe (19);

a first electric machine (8), which is able to transmit the motion to the drive wheels (3) and is controlled by a first electronic control device (13) electrically connected to an electrical energy storage system (14); and a second electric machine (28), which is mechanically connected to the turbine (26) of the turbocharger (25) and is controlled by a second electronic control device (29) electrically connected to the electrical energy storage system (14);

the control method comprises the steps of:

establishing a target torque (TTE) to be generated by the internal combustion heat engine (5); and controlling the internal combustion heat engine (5) so as to pursue the target torque (TTE);

wherein, in a first operating mode, the step of controlling the internal combustion heat engine (5) so as to pursue the target torque (TTE) comprises the further steps of:

varying the degree of opening of the throttle valve (21) so as to adjust the flow rate of fresh air fed to the cylinder (16) in order to vary the torque generated by the internal combustion heat engine (5); and feeding into the cylinder (16) a quantity of fuel that, based on a stoichiometric ratio, depends on the quantity of fresh air entering the cylinder (16);

wherein, in a second operating mode, the step of controlling the internal combustion heat engine (5) so as to pursue the target torque (TTE) comprises the further steps of:

completely opening the throttle valve (21) and always keeping it completely open;

operating the second electric machine (28) as an electric generator so as to absorb torque from the turbine (26);

operating the first electric machine (8) as a motor so as to deliver torque to the drive wheels (3);

varying the electric power generated by the second electric machine (28) so as to adjust the flow rate of fresh air fed to the cylinder (16) in order to vary the torque generated by the internal combustion heat engine (5); and feeding into the cylinder (16) a quantity of fuel that, based on a stoichiometric ratio, depends on the quantity of fresh air entering the cylinder (16);

wherein the speed of rotation of the internal combustion heat engine (5) ranges from a minimum value ($\omega min$) to a maximum value ($\omega max$);

wherein the torque generated by the internal combustion heat engine (5) initially increases as the speed of rotation increases, until a maximum value (Tmax) is reached at a speed of rotation ($\omega Tmax$) of the maximum torque, and decreases as the speed of rotation increases subsequent to the speed of rotation ($\omega$Tmax) of the maximum torque; and wherein the second operating mode is used only when the actual speed of rotation of the internal combustion heat engine (5) is greater than the speed of rotation ($\omega$Tmax) of the maximum torque.

15. The control method according to claim 1, wherein, in the second operating mode, the electric power generated by the second electric machine (28) is increased in order to decrease the flow rate of fresh air fed to the cylinder (16) and, hence, decrease the torque generated by the internal combustion heat engine (5) and vice versa.

16. The control method according to claim 1, wherein the hybrid drive system (4) is always started by using the first operating mode.

17. The control method according to claim 16, wherein the second operating mode is used instead of the first operating mode only in given conditions.

18. The control method according to claim 1, wherein the second operating mode is used when the road vehicle (1) is driving on a highway.

19. The control method according to claim 1, wherein, in the second operating mode, the fast adjustment of the torque generated by the hybrid drive system (4) is carried out by varying the torque generated by the first electric machine (8), and the slow adjustment of the torque generated by the hybrid drive system (4) is carried out by varying the torque generated by the internal combustion heat engine (5).

20. The control method according to claim 19 and comprising, in the second operating mode, the further steps of:

establishing a target torque (TT) to be generated by the hybrid drive system (4);

dividing the target torque (TT) of the hybrid drive system (4) into a target torque (TTE) of the internal combustion heat engine (5) and a target torque (TTM1) of the first electric machine (8); and in case of change of the target torque of the hybrid drive system (4), varying the target torque (TTM1) of the first electric machine (8) faster and varying the target torque (TTE) of the internal combustion heat engine (5) slower.

21. The control method according to claim 1, wherein:

the speed of rotation of the internal combustion heat engine (5) ranges from a minimum value ($\omega$min) to a maximum value ($\omega$max);

the torque generated by the internal combustion heat engine (5) initially increases as the speed of rotation increases, until a maximum value (Tmax) is reached at a speed of rotation ($\omega$Tmax) of the maximum torque, and decreases as the speed of rotation increases subsequent to the speed of rotation ($\omega$Tmax) of the maximum torque; and the second operating mode is used only when the actual speed of rotation of the internal combustion heat engine (5) is greater than the speed of rotation ($\omega$Tmax) of the maximum torque.

* * * * *